United States Patent [19]

La Pierre

[11] Patent Number: 5,092,478
[45] Date of Patent: Mar. 3, 1992

[54] TAMPER-EVIDENT TEAR-OFF STRIP FOR CONTAINER CAP

[76] Inventor: Maurice La Pierre, 540, Des Peupliers, P.O. Box 127, Piedmont, Québec, Canada, J0R 1K0

[21] Appl. No.: 702,372

[22] Filed: May 20, 1991

[51] Int. Cl.⁵ ............................................. B65D 41/48
[52] U.S. Cl. .................................. 215/256; 220/276; 206/509
[58] Field of Search .................. 215/256, 10; 206/509; 220/276

[56] References Cited

U.S. PATENT DOCUMENTS

| | | | |
|---|---|---|---|
| 3,387,749 | 6/1968 | Godshalk et al. | 215/10 X |
| 4,625,876 | 12/1986 | Bullock, III | 215/256 |
| 4,699,287 | 10/1987 | Bullock | 215/256 |
| 4,798,301 | 1/1989 | Bullock et al. | 215/256 |
| 4,801,032 | 1/1989 | Crisci | 215/256 |
| 4,815,620 | 3/1989 | Bullock, III | 215/256 |
| 4,903,849 | 2/1990 | Wallman | 215/256 |
| 4,951,830 | 8/1990 | Cochrane | 215/256 |
| 4,961,512 | 10/1990 | Von Holdt | 220/270 |

*Primary Examiner*—Stephen P. Garbe
*Assistant Examiner*—Nova Stucker
*Attorney, Agent, or Firm*—Pierre Lesperance

[57] ABSTRACT

A safety device for providing clues that a capped container has been opened a first time. Frictional male female joints releasably interconnect the cap to the container. This safety device is of the tear-off type, wherein by peeling one peripheral portion of the annular wall portion of the container cap, the cap can be released from the container mouth, while at least some frictional joints remain between the cap to enable continuous efficient interconnection capability regardless of the number of cap opening/closure cycles. The peeled cap strip is then disposed of—it is not reusable. Thus, its absence about cap signals that someone has already opened the cap to access the content of the container.

3 Claims, 1 Drawing Sheet

TAMPER-EVIDENT TEAR-OFF STRIP FOR CONTAINER CAP

FIELD OF THE INVENTION

This invention is directed toward safety caps for containers.

BACKGROUND OF THE INVENTION

Considerable public concern has built up in recent years with respect to fears of criminal contamination with toxic substances of bottled edible foodstuff, by terrorists, psychopaths or other disturbed individuals. Among the preferred targets of these criminals are pharmaceutical capsules in bottles. Tragic cases of widespread intoxication from such criminal contamination of substances to be ingested, are regularly reported in the news media.

Safety caps exist to restrict access to the content of a bottle to authorized persons. Usually, these safety caps are directed to prevent totes and small children, or alternately, to try to discourage unstable individuals with suicidal tendencies, from easily reaching medication which may be toxic or even lethal at high, non-monitored dosage. To be able to open these safety caps, a special protocol has to be followed, beyond the basic technique of axial pulling of the cap or spreading apart of the annular wall portion thereof to release the cap from the container mouth, that a small child will quickly learn to do.

Other safety caps exist which are directed toward providing clues that the cap has been opened a first time. However, these latter caps usually become inefficient in sealing closing the container mouth, after the tamper-evidencing means were disengaged. Indeed, deactivation of such tamper-evidencing means after first opening of the safety cap usually comprises the snap fit or frictional locking means involved in otherwise securing performance of the cap to the container mouth.

OBJECTS OF THE INVENTION

The gist of the invention is therefore to provide a safety cap for a container, having tamper-evidencing means which will not compromise the efficiency of the anchoring seal of the cap after first opening of the cap.

A general object of the invention is to provide such safety caps, for bottles which can be conveniently stacked in superimposed upright position.

An underlying object of the invention is to address the problem of criminal contamination of bottled edible substances, by providing a tamper-evidencing cap which will not compromise the releasable locking capability of the cap after the tamper-evidencing device is disposed off after first opening of the cap.

SUMMARY OF THE INVENTION

Accordingly with the objects of the invention, there is disclosed a safety cap for use in closing the open mouth of a container, said cap comprising a main wall, for closing said mouth, securing means for releasably anchoringly applying said cap wall against said mouth, and tamper-evident means, to provide clues that said securing means was deactivated a first time; wherein the efficiency of said securing means remain unaffected upon activation of said tamper-evident means pursuant to cap opening.

More particularly, the invention would consist of a safety cap container comprising: a main cylindrical wall having a bottom wall at one end and a mouth at the opposite end, said mouth defining a cylindrical wall portion having a rim; a safety cap, consisting of a discoid wall from which edgewisely transversely depends an annular wall, said safety cap annular wall releasably engaging the radially outer face of said mouth cylindrical wall portion; first frictional locking means, to frictionally releasably interconnect a first portion of said safety cap annular wall distal from said rim, to said mouth cylindrical wall portion; second frictional locking means, to frictionally releasably interconnect a second portion of said safety cap annular wall proximal to said rim; and tamper-evident means, permanently deactivating said first frictional locking means as a clue that said cap was opened a first time.

DETAILED DESCRIPTION OF THE INVENTION

Figure 2:
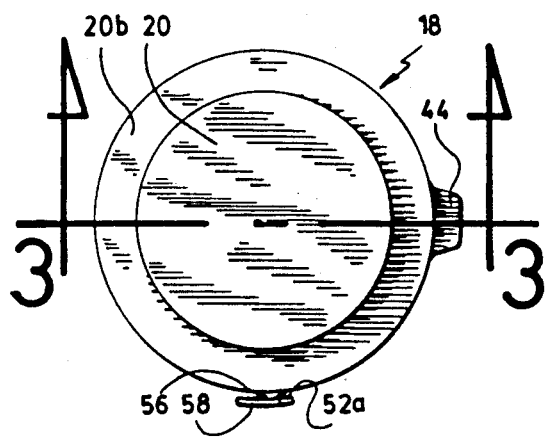
FIG. 2 is a top plan view of the container cap from FIG. 1.
Figure 3:
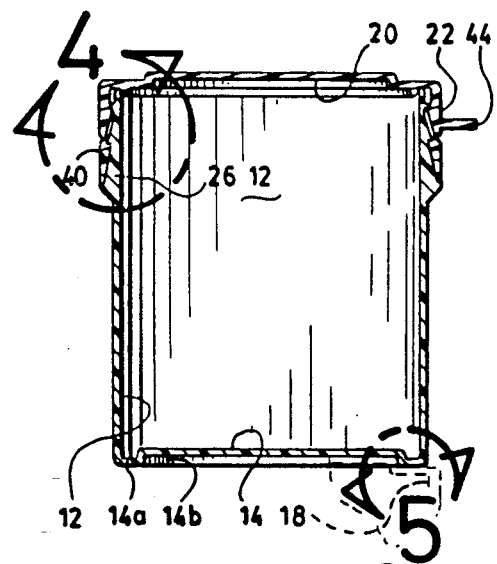
FIG. 3 is a sectional view of the capped container of FIG. 1, taken along line 3—3 of FIG. 2.

Container 10 defines a main cylindrical wall 12, a bottom discoid wall 14 edgewisely integrally merging with one end of wall 12, and an annular mouth 15 at the end opposite end wall 14. A circular rim 16 is defined by mouth 15. A cap 18 is destined to releasably close mouth 16. Cap 18 defines a main discoid wall 20 and an annular wall 22 integrally merging with the peripheral edge of wall 20 transversely thereof.

Preferably, container wall 14 is flat and inwardly offset about annular section 14a, i.e. engages radially inwardly of container wall 12, whereas cap wall 20 is flat and outwardly offset about annular section 20a, i.e. extends in a direction opposite annular wall 22. Hence, a number of capped containers 10, 10′, 10″, . . . can be stacked in stable, superimposed, upright position, with their relative radial displacement prevented, as suggested in FIG. 5.

Offset wall 14 should be orthogonal to the central lengthwise axis of cylindrical wall 12, while offset wall 20 should be orthogonal to the central lengthwise axis of annular wall 22, for maintaining stability of successively vertically stacked capped containers 10. Advantageously, the annular peripheral edge section 20b of cap wall 20 is flat and radially wider than the peripheral flat edge section 14b of bottom wall 14, to promote seating of the latter on the former when upright containers 10, 10′, 10″, . . . are stacked, as clearly illustrated in FIG. 5.

Profitably, annular section 14a is orthogonal to walls 14 and 14b, and annular section 20a, orthogonal to walls 20 and 20b.

Figure 4:
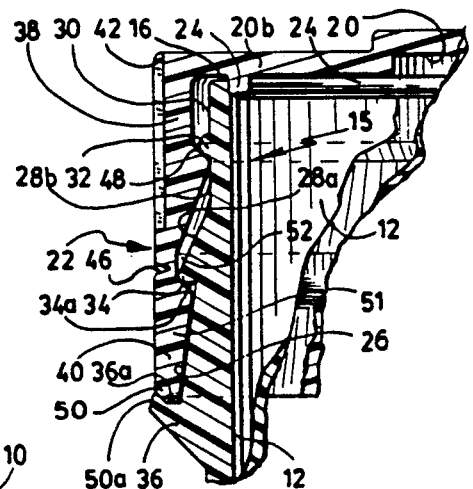
FIGS. 4–5 are enlarged views of the areas circumscribed by arrows 4 and 5 respectively of FIG. 3.
Figure 5:
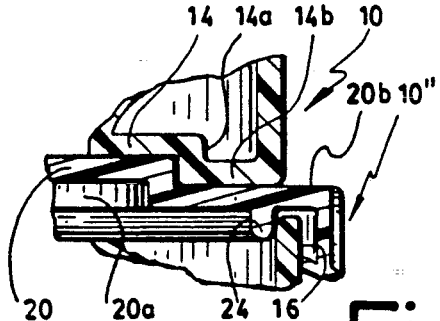

As suggested in FIGS. 4–5, cap 18 preferably includes an inward annular lip 24, extending radially inward of annular wall 22 spacedly therefrom. Lip 24 is destined to engage the radially inward edge section of the container mouth rim 15, in a frictional fashion (releasably). The annular free edge of lip 24 may have any suitable shape, e.g. flat or convex.

According to the invention, container mouth 15 is rigid, generally thicker than coextensive cylindrical wall 12. With reference to FIG. 4, thick annular wall portion 15 defines on its radially outward face:

(a) a first groove 26, opposite rim 16 and radially inwardly slanted (toward rim 16) along a slight inclination;

(b) a second elbowed groove intermediate groove 26 and rim 16, and defining a first groove portion, 28a, adjacent groove 26 and radially inwardly slanted along a steeper inclination than groove 26, and a second axial portion, 28b; and (c) a rim axial portion 30.

Mouth portions 28b and 30 are each slightly thinner than wall 12, flat, and spaced by a radially outwardly projecting, convex bulge 32. The flange 34 of groove 26 adjacent groove portion 28a is radially extending, to define a flat radial seat 34a farther radially outwardly than bulge 32. The flange 36 of groove 26 opposite flange 34 is also radially extending, to define a generally concave radial seat 36a farther radially outwardly than flange 34. Preferably, generally concave radial seat 36a is not smooth surfaced but rather has a somewhat irregular, polygonal shape configuration.

Cap wall 22 is made from a rigid tearable material, e.g. a suitable plastic compound, but should disclose same resilient elasticity. Cap wall 22 defines a first portion 38, merging with the cap wall portion 20b, and a second free end portion 40, coextensive with the first portion 38. Preferably, the radially outer surface of cap portion 38 is knurled, at 42, to facilitate screw handling of the cap 18. A radially outwardly projecting tab 44 depends from a section of knurled wall 42 (FIG. 2). An annular V-shape notch 46 separates cap portions 38 and 40 on their radially outward face.

The radially inward face of cap portion 38 defines an intermediate V-shape ridge 48. Cap wall portion 40 thicknesswisely slightly tapers towards its free end 50, from its thicker opposite end 51. Cap wall end 50 is preferably slanted at its radially outward edge 50a. V-shape notch wall portion 52 (in register with V-notch 46) is the thinnest portion of cap wall 18. Cap portion 51 radially inwardly extends at a position intermediate radially inwardmost V-ridge 48 and radially outwardmost V-shape notch portion 52.

Thus, upon engagement of cap 18 onto container mouth 15 (FIG. 4), cap end 50 will be brought to axially engage annular thicknesswise trough 36a of cap wall 15. In so doing, lip 36 will frictionally lockingly engage slanted edge 50a, to prevent unauthorized radially outward release of tongue 50 from trough 36a, e.g. with a fingernail. Axial displacement of cap 18 along mouth 15 is prevented by frictionally radially inward engagement of cap ridge 48 with the axially inward edge of convex bulge 32, and also by frictionally radially outward engagement of mouth ridge 34, into cap trough 52.

Annular lip 24 prevents radially inward caving in of mouth 15, should a radially inwardly directed forcible bias be applied against cap wall portion 38. Hence, safety cap 18 thus engaged onto container mouth 15 cannot be removed by ordinary means, not even by axial pulling of tab 44.

Figure 1:
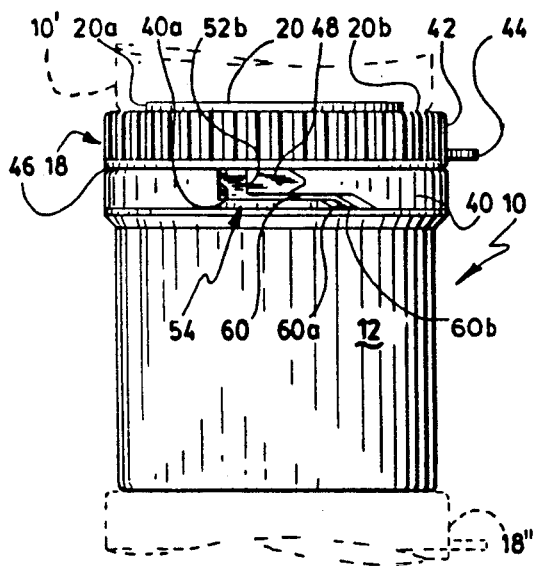
FIG. 1 is a side elevation of a cylindrical container having a cap provided with a tear-off strip according to the invention.

Accordingly with the heart of the invention, and as suggested in FIGS. 1-2 of the drawings, a tamper-evident feature 54 is added to cap wall portion 40, to enable release of the safety cap 18 from sealed container mouth 15. More particularly, tamper-evident feature 54 consists in means for peripherally tearing down cap portion 40 as an elongated band or strip to be circumferentially detached and released from cap 18, wherein annular trough 36a is vacated by edge 50 of wall 40 whereby cap 18 can be released from container mouth 15 by axial pulling of finger tab 44.

The tear primer of tamper evident means 54 includes a radial arm 56, radially outwardly projecting from a section 52a of thinnest wall portion 52 of cap 18 adjacent V-notch 46, and a transverse tongue 58, depending from the radially outer end of arm 56 and tangentially extending spacedly from wall portion 40. Annular v-notch wall portion 52 therefore constitutes a weak line that will tearingly yield to a circumferential arcuate pulling bias applied at tongue 58 along wall 40. Before band wall 40 is torn open, a small cut-out section 52b is factory made (FIG. 1), together with a registering radially outward cavity portion 40a of wall 40, to enable easy start up of said band tearing. Cut out 52 is located adjacent V-notch 46. An axially medial, peripherally extending weak line 60 is further factory made on wall 40, proximate end 50, with one end in transverse register and merging with cavity 40a, and extending parallel to aperture 52b and free end 50. Weak line 60 axially diverges at 60a toward and merges with cap edge 50, to open at 60b into trough 36a.

Thus, starting at position 60b, weak line 60 enables tongue 58 which is being pulled peripherally of cap 18, to tear the full width of band 40. Accordingly, weak line 60 should be relatively short in length, e.g. a circle of an arc corresponding to about one radian of annular wall 40, as suggested in FIG. 1.

It is understood that, as band 40 is peeled off from cap 18, only portion 42 and depending main wall 20 of cap 18 eventually remains. Nonetheless, cap 18 will continue to be operative in lockingly releasably closing mouth 15, for numerous cyclic closures/openings thereof, since interacting frictional lock means 32, 48 and 16, 24 still remain to secure the cap to the container. Before as well as after tear band 40 has been peeled off, capped container 12 can still be full effective in sealingly retaining its content, be it a solid e.g. granular material or a fluid.

The material constituting wall 40 should be of a type enabling such tearing down action thereof along a circumferential path, e.g. a suitable plastic material.

It is envisioned to provide a written warning sign (not illustrated) that the container seal has been broken, such as the inscription TAMPER SEAL BROKEN in English, French and German. Such warning sign would be concealed radially inwardly of the tearable strip 40, e.g. against outer wall 26 of container mouth 15 and preferably mounted thereto either by engraving or by the addition thereon of a thin, self-adhesive flexible band. Hence, when tearable strip 40 is removed, the warning sign becomes uncloaked.

Preferably, tongue 56 and finger 52a are semi-flexible, to facilitate handling thereof. Advantageously, the whole cap 18 will be semi-flexible, whereas container 10 will be positively rigid in construction. Both cap and container should preferably be made from a suitable plastic material.

I claim:

1. In combination, a rigid cylindrical container having a mouth portion at one end thereof, and a semi-rigid, peelable safety cap releasably engaging said mouth portion;

said container cylindrical mouth portion defining:

(a) an annular free edge rim, said rim defining a circular mouth in a plane substantially orthogonal to a central longitudinal axis of said cylindrical container;

(b) a first, thin, annular part, of substantially constant radial thickness, endwisely merging with said annular rim and defining a radially outwardly projecting, integral first flange;

(c) a second, thicker, annular part, thicknesswisely tapering radially towards said rim and defining a second, radially outwardly projecting flange at the farthest end of said mouth portion relative to said rim, said second flange further defining a transverse annular lip at its radially outwardmost edge, said annular lip defining a free edge generally extending toward said plane wherein an annular, axial cavity is defined, said axial cavity opening toward said plane;

(d) a third annular part, integrally interconnecting said first and second annular parts, said third part thicknesswisely tapering radially from a thickest annular section, adjacent said second part, to a thinnest annular section, adjacent said first part, said thickest annular section thereof forming a radially outwardly projecting third flange relative to and offset from the adjacent section of said second part;

said safety cap defining a main, flat, circular wall, provided with an edgewise, transversely extending, integral, cylindrical wall, a fourth integral annular flange transversely depending from said cap main wall spaced radially inwardly of said cap cylindrical wall, said cap cylindrical wall defining:

(e) a fourth annular part, adjacent said cap flat wall and of constant radial thickness, a fifth radially inwardly projecting flange being defined at an intermediate section of said fourth part; and (f) a fifth annular part, integral to said fourth part and of radial thickness tapering away from a central longitudinal axis through said cap, said fifth part defining an annular, radially thinner, free edge rim and a radially thicker opposite end, the radially thicker opposite end being radially thicker than the adjacent section of said cap fourth part so as to define a sixth flange, said cap free edge rim defining a cap mouth;

whereby said container and said cap are engaged when said container rim frictionally radially engages the radially outward face of said cap fourth flange, and said cap rim engages into said container second flange annular cavity, frictionally radially against said container second flange lip under a biasing force from said container first flange axially engaging with said cap fifth flange and from said container second flange axially engaging with said cap sixth flange;

wherein fingernail release of said cap rim from said container second flange annular cavity is positively prevented by said second flange lip which radially outwardly conceals said cap rim and thus prevents fingernail access thereto;

said cap further including tamper evident tear off means, comprising a tear off section of said cap cylindrical wall, for releasing said safety cap from said container so as to enable and to reveal access to said container through said container mouth.

2. A container as defined in claim 1,
wherein said first flange is cross-sectionally semi-circular; said third flange is of generally conical shape in cross-section; said fourth flange is cross-sectionally quadrangular; and each of said fifth and sixth flanges is cross-sectionally conical.

3. A container as defined in claim 2,
wherein said container second flange annular cavity is roughly U-shape in cross-section.

* * * * *